United States Patent
Vasseur et al.

(10) Patent No.: US 10,243,980 B2
(45) Date of Patent: Mar. 26, 2019

(54) EDGE-BASED MACHINE LEARNING FOR ENCODING LEGITIMATE SCANNING

(71) Applicant: Cisco Technology, Inc., San Jose, CA (US)

(72) Inventors: Jean-Philippe Vasseur, Anchorage, AK (US); Grégory Mermoud, Veyras (CH); Pierre-André Savalle, Rueil-Malmaison (FR); Alexandre Honoré, Schaerbeek (BE)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 15/205,732

(22) Filed: Jul. 8, 2016

(65) Prior Publication Data
US 2017/0279833 A1    Sep. 28, 2017

Related U.S. Application Data

(60) Provisional application No. 62/312,726, filed on Mar. 24, 2016.

(51) Int. Cl.
*H04L 29/06* (2006.01)
*H04L 12/751* (2013.01)

(52) U.S. Cl.
CPC .......... *H04L 63/1425* (2013.01); *H04L 45/08* (2013.01); *H04L 63/1433* (2013.01); *H04L 63/1458* (2013.01); *H04L 2463/144* (2013.01)

(58) Field of Classification Search
CPC .................. H04L 63/1416; H04L 63/1408
See application file for complete search history.

(56) References Cited

U.S. PATENT DOCUMENTS

| 7,356,587 B2 | 4/2008 | Boulanger et al. |
| 8,402,543 B1 * | 3/2013 | Ranjan ............... H04L 63/1416 709/223 |
| 2005/0137980 A1 | 6/2005 | Bullock et al. |
| 2007/0064617 A1 | 3/2007 | Reves |
| 2008/0016339 A1 * | 1/2008 | Shukla .................. G06F 21/53 713/164 |
| 2008/0140795 A1 * | 6/2008 | He ...................... H04L 63/1416 709/207 |

(Continued)

OTHER PUBLICATIONS

Lee et al. "Data Mining Approaches for Intrusion Detection¹" Computer Science Department Columbia University; Apr. 27, 2016; pp. 1-22.

*Primary Examiner* — Jason K Gee
(74) *Attorney, Agent, or Firm* — Behmke Innovation Group LLC; James Behmke; Stephen D. LeBarron

(57) ABSTRACT

In one embodiment, a device in a network receives an indication that a network anomaly detected by an anomaly detector of a first node in the network is associated with scanning activity in the network. The device receives labeled traffic data associated with the detected anomaly that identifies whether the traffic data is associated with legitimate or illegitimate scanning activity. The device trains a machine learning-based classifier using the labeled traffic data to distinguish between legitimate and illegitimate scanning activity in the network. The device deploys the trained classifier to the first node, to distinguish between legitimate and illegitimate scanning activity in the network.

18 Claims, 12 Drawing Sheets

(56) References Cited

U.S. PATENT DOCUMENTS

2012/0278890 A1* 11/2012 Maatta .................. H04L 43/062
                                                             726/23
2015/0254555 A1    9/2015 Williams, Jr. et al.
2016/0381042 A1* 12/2016 Zhang ................... H04L 63/145
                                                             726/24

* cited by examiner

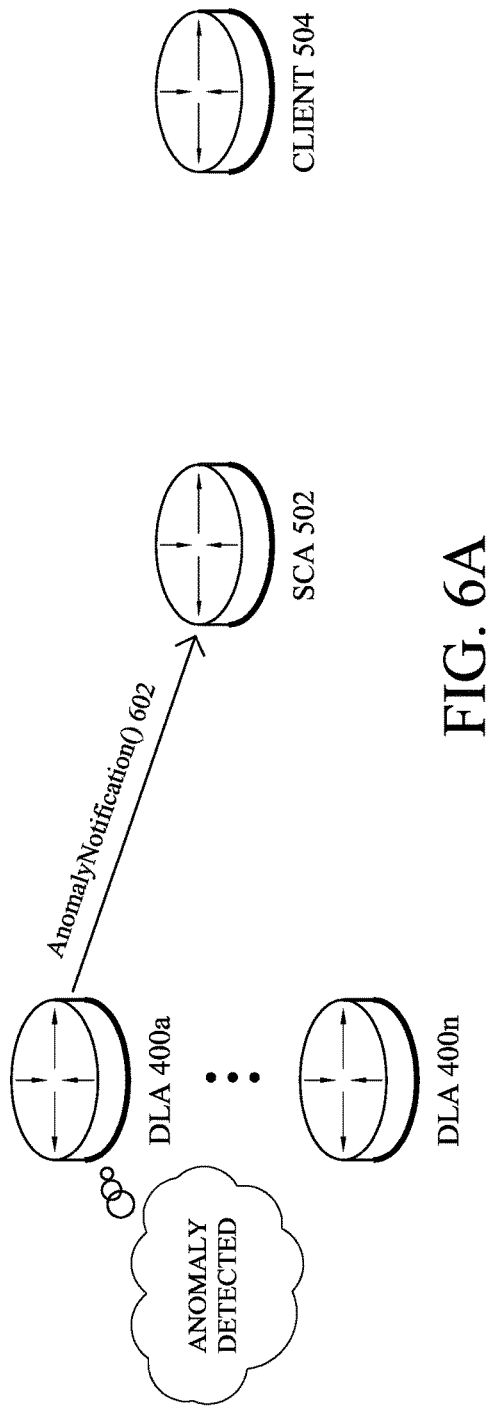
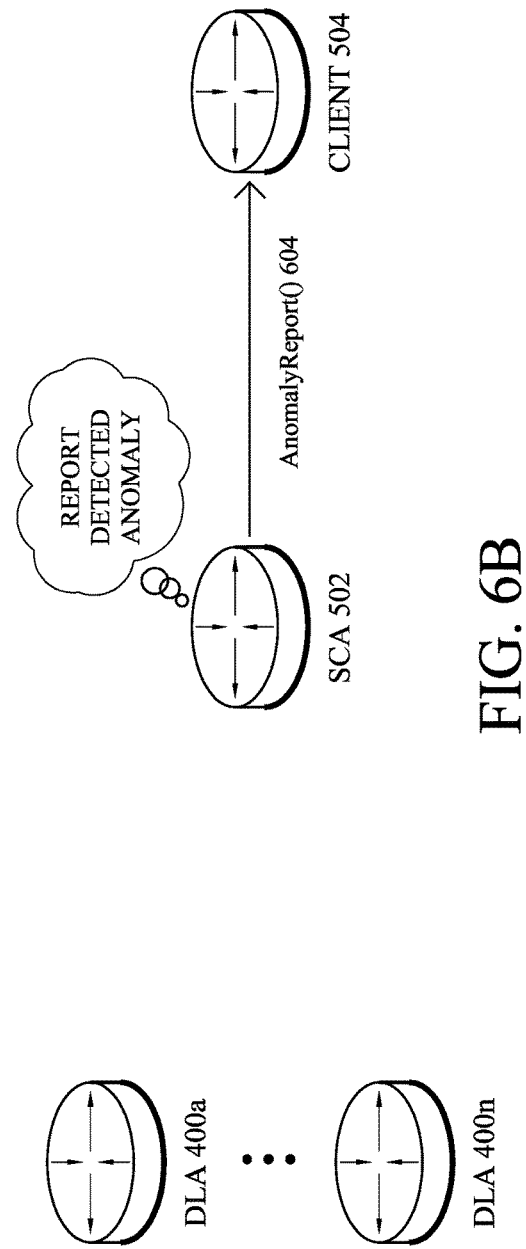
FIG. 6A
FIG. 6B

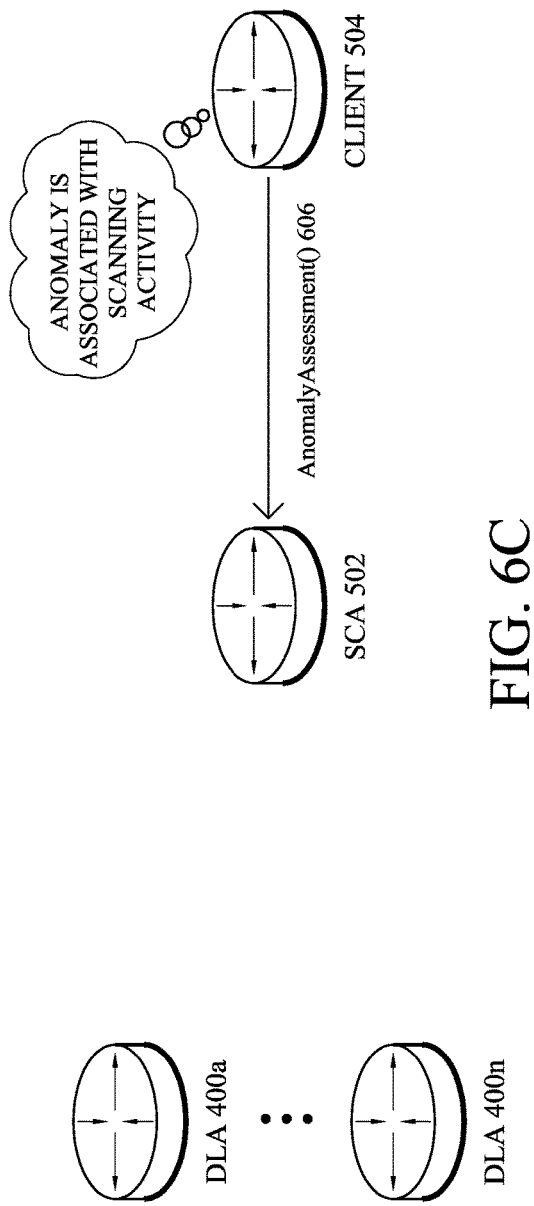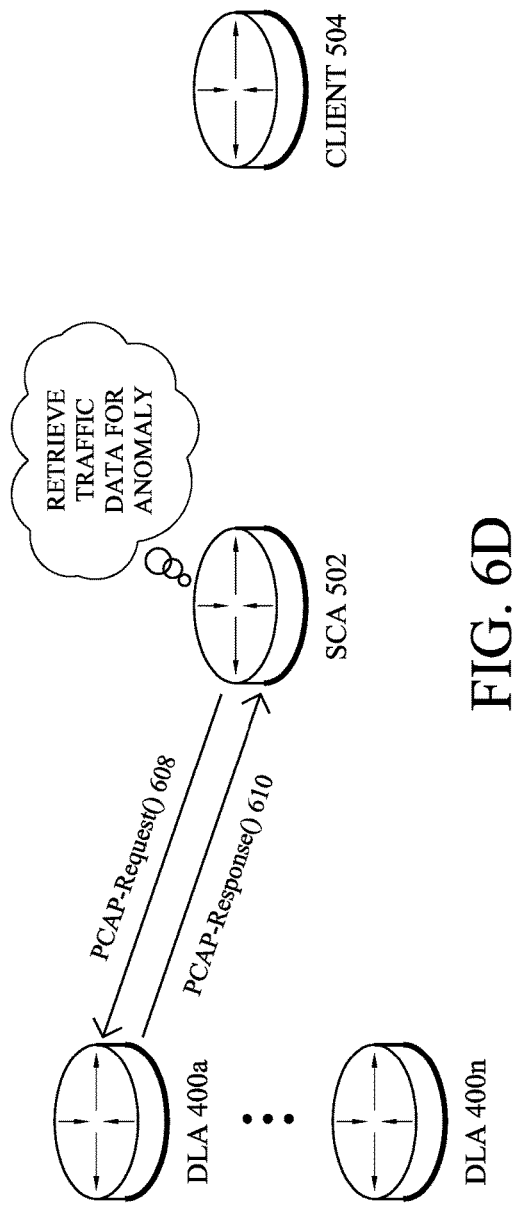

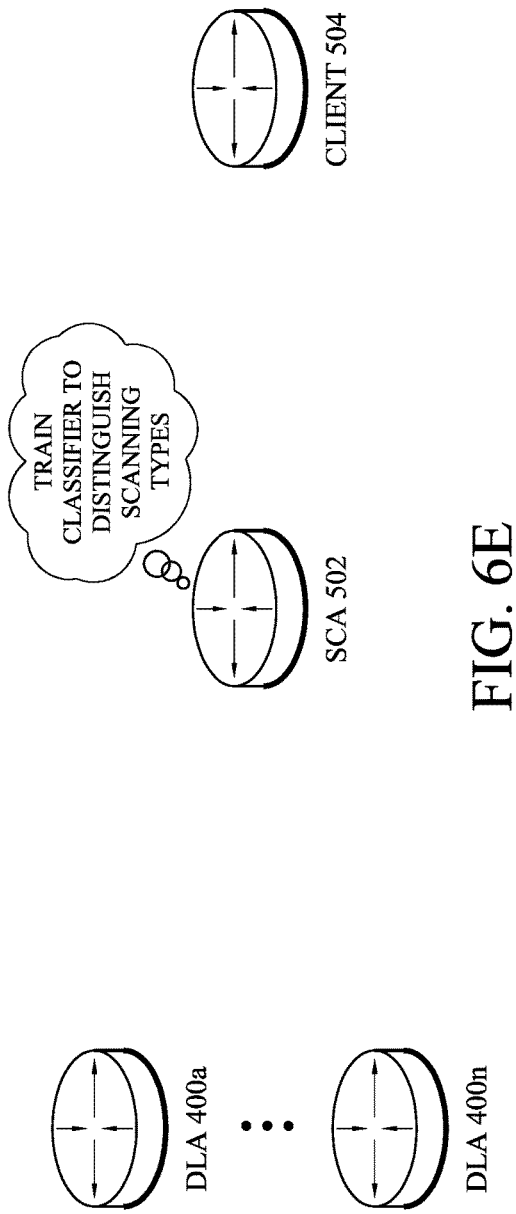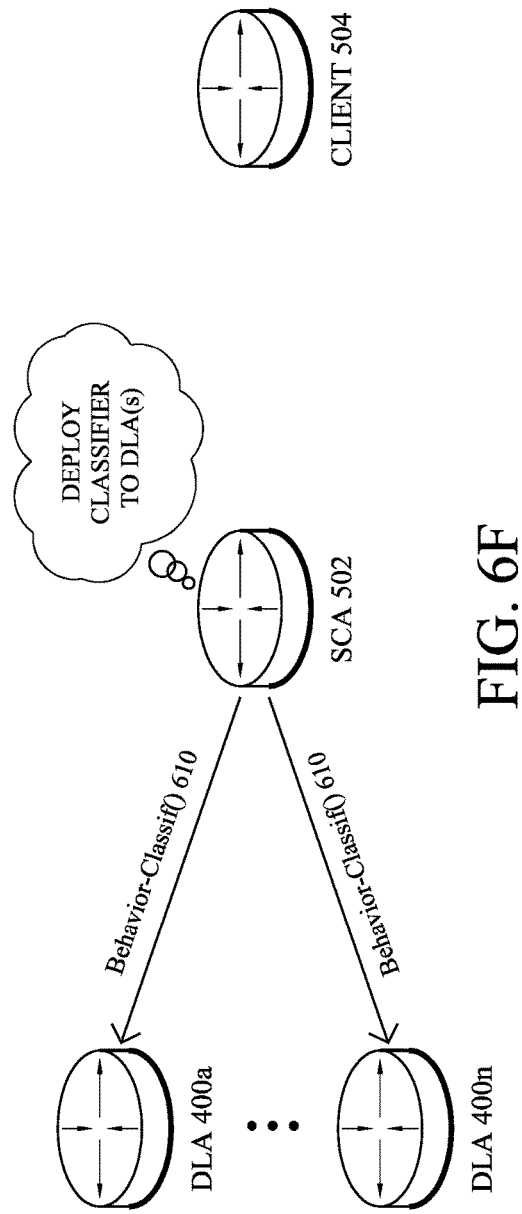

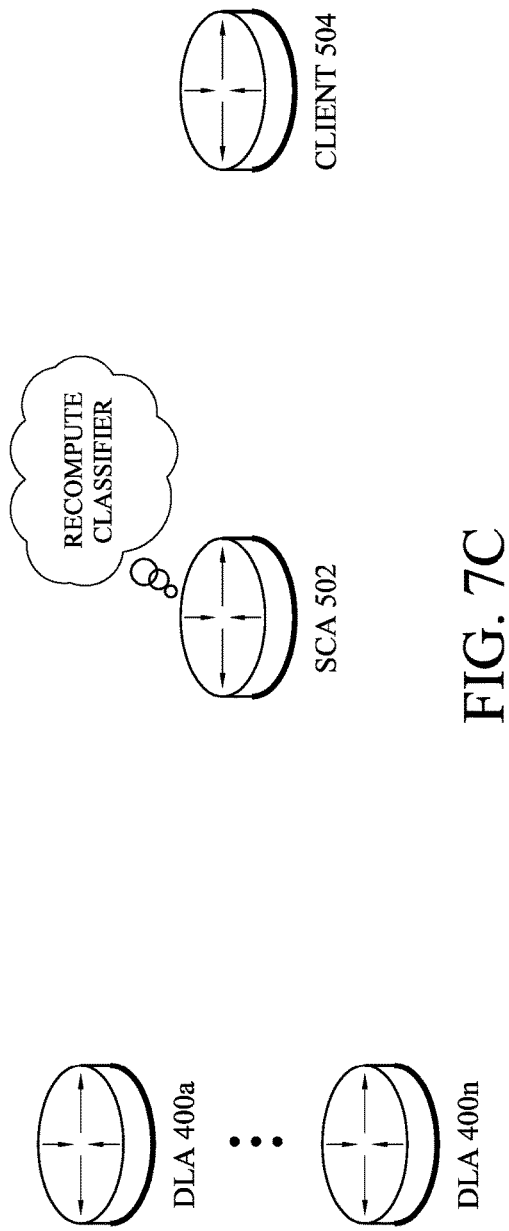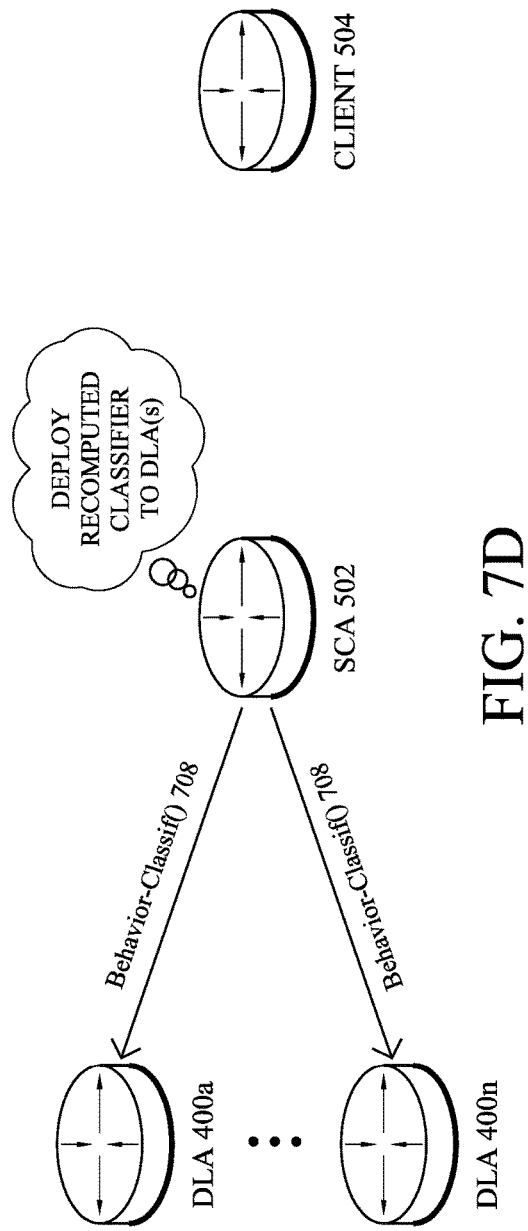

EDGE-BASED MACHINE LEARNING FOR ENCODING LEGITIMATE SCANNING

RELATED APPLICATION

This application claims priority to U.S. Provisional Application No. 62/312,726, filed on Mar. 24, 2016, entitled "EDGE-BASED MACHINE LEARNING FOR ENCODING LEGITIMATE SCANNING," by Vasseur, et al., the contents of which are herein incorporated by reference.

TECHNICAL FIELD

The present disclosure relates generally to computer networks, and, more particularly, to edge-based machine learning for encoding legitimate scanning.

BACKGROUND

Network scans may be either legitimate or illegitimate. In the first case, certain network services may perform network scans to discover devices in the network, for purposes of ensuring network security, and for other legitimate reasons. For example, a network management system (NMS), identity service engine (ISE), or the like, may perform legitimate network scans. In the latter case, a malicious node in the network is may perform network scans to identify security vulnerabilities (e.g., ports, applications, etc.) in the network that can be exploited for purposes of distributing malware, performing social engineering, or for other malicious reasons.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6F illustrate an example of the deployment of a scan classifier;

FIGS. 7A-7D illustrate an example of the retraining of a scan classifier.

DESCRIPTION OF EXAMPLE EMBODIMENTS

Overview

Figure 1A:
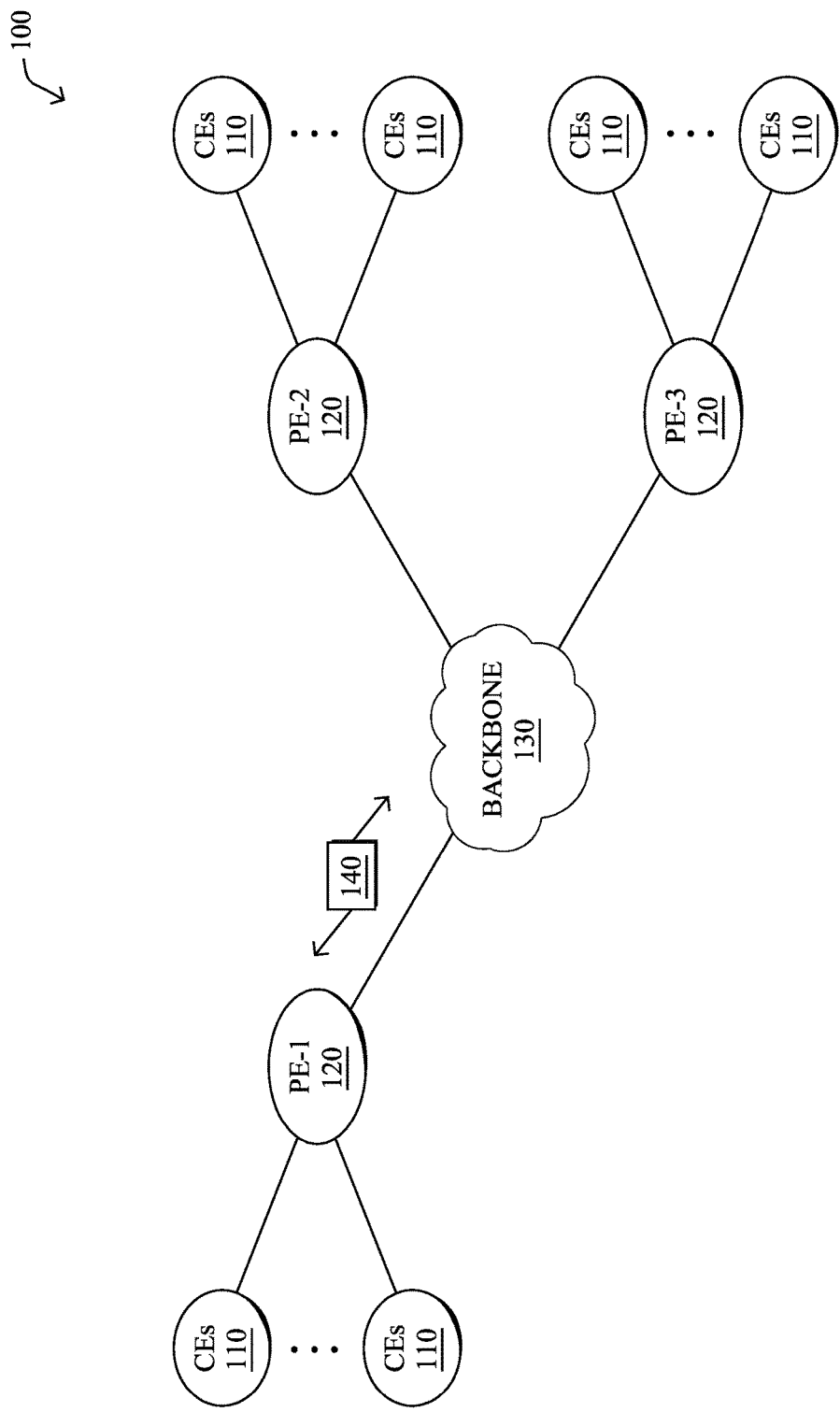
FIGS. 1A-1B illustrate an example communication network.

According to one or more embodiments of the disclosure, a device in a network receives an indication that a network anomaly detected by an anomaly detector of a first node in the network is associated with scanning activity in the network. The device receives labeled traffic data associated with the detected anomaly that identifies whether the traffic data is associated with legitimate or illegitimate scanning activity. The device trains a machine learning-based classifier using the labeled traffic data to distinguish between legitimate and illegitimate scanning activity in the network. The device deploys the trained classifier to the first node, to distinguish between legitimate and illegitimate scanning activity in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each is network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
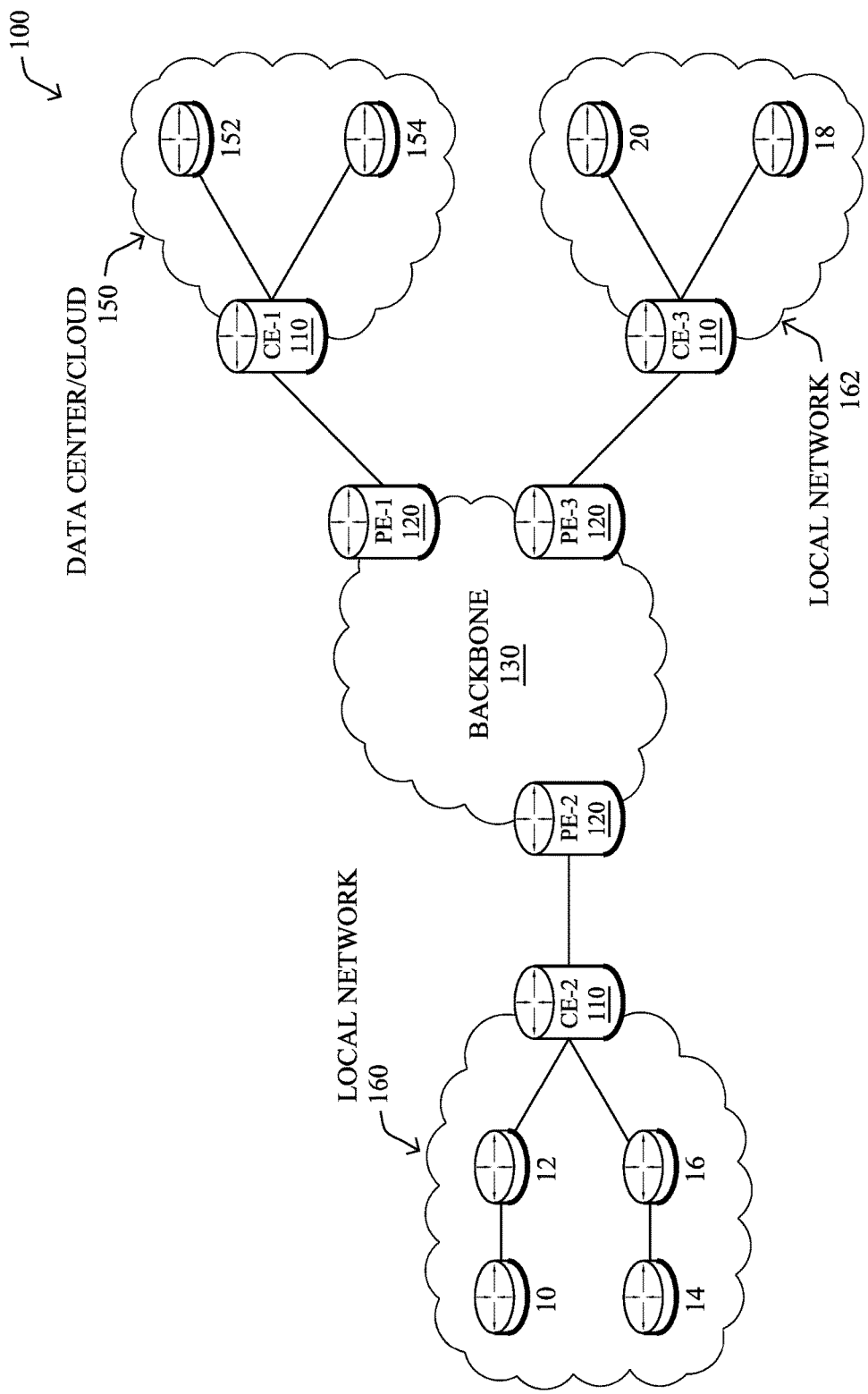

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a is network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal is changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
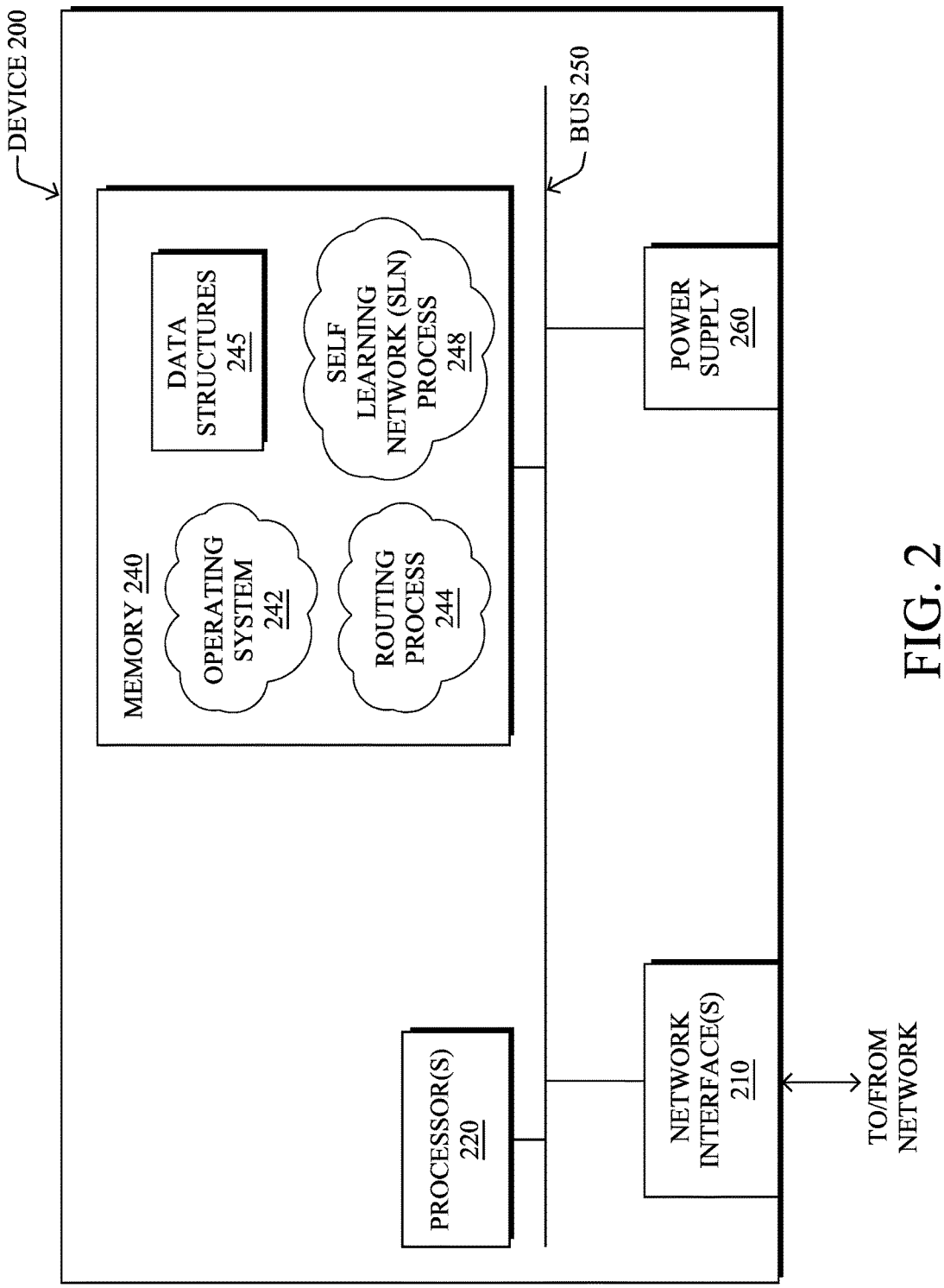
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), is portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based is Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may is construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes is interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
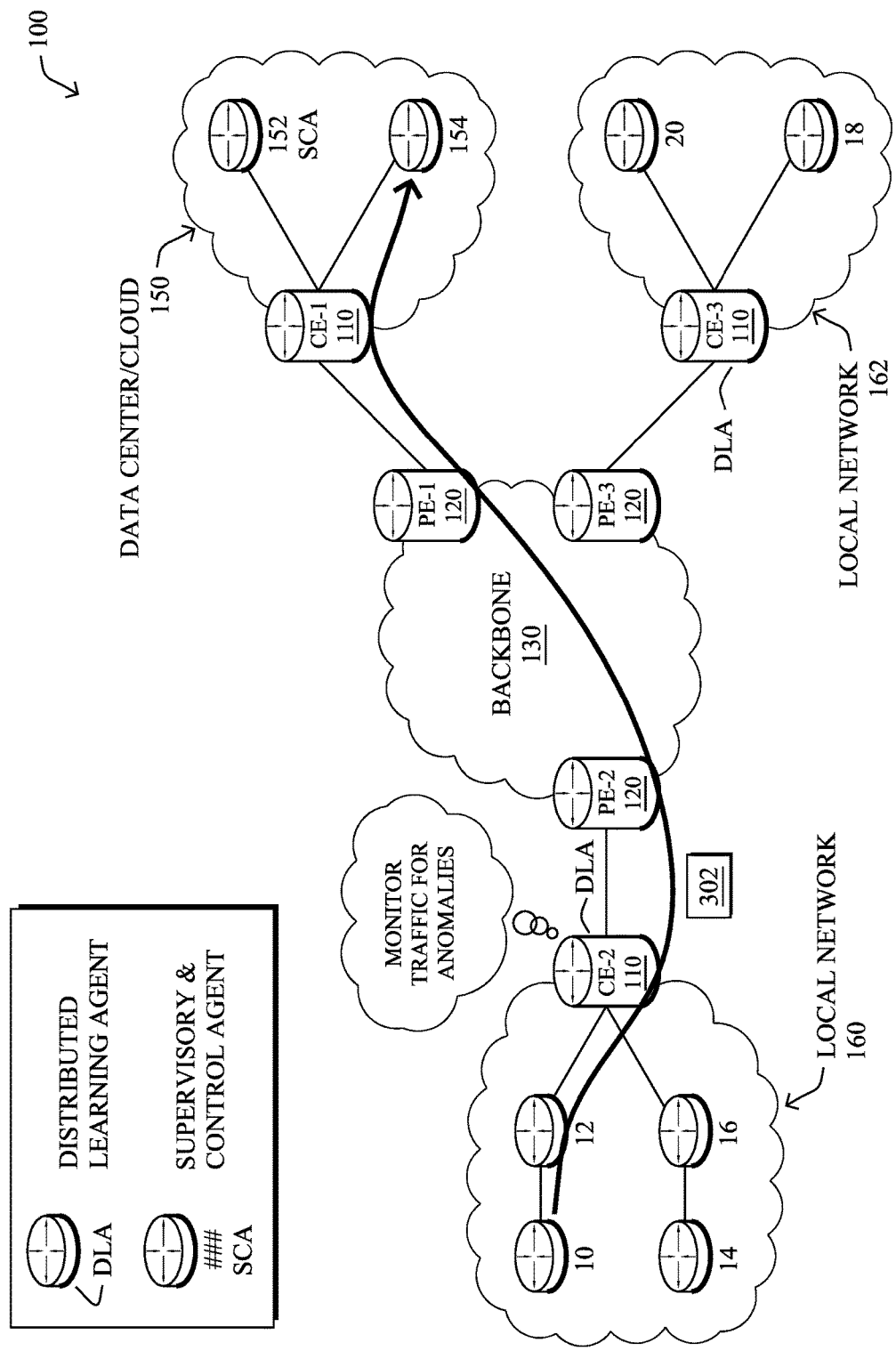
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two is classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal is movement (e.g. propagation of a malware, etc.), or an attempt to perform information exfiltration.

Figure 4:
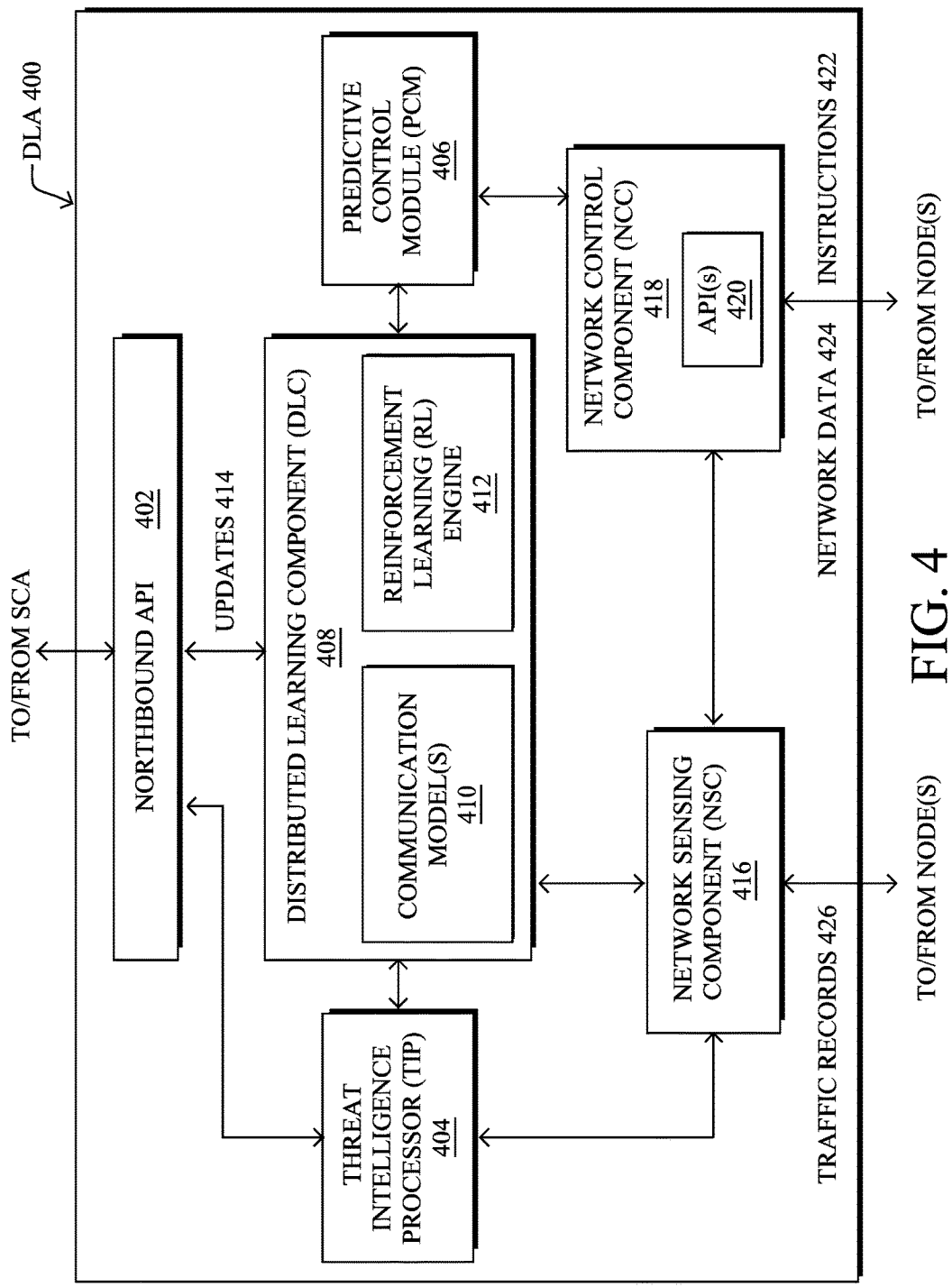
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self is Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate is or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as CiscoTM OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of is such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, network scanning in a network may be triggered by various types of devices, such as legitimate scanners and illegitimate scanners. Since legitimate and illegitimate scanning may co-exist in the network, this raises a key challenge for an anomaly detection mechanism to detect and flag only illegitimate scanning activity in the network. Notably, one approach to reduce false positives would be to use manual white listing of certain scans (e.g., from an NMS, ISE, etc.). However, such an approach is extremely impractical, cumbersome, and does not apply to the frequent situation of new scanners being added to the network.

——Edge-Based Machine Learning for Encoding Legitimate Scanning——

The techniques herein perform a dynamic encoding of scanning behaviors using statistical models (e.g., one-class SVMs, density estimation, class-biased logistic regression, or linear coding approaches, possibly on top of a representation learning stage based on auto-encoders), which are dynamically trained on-the-fly upon detecting legitimate scanning and then uploaded at the edge of the network (e.g., to a DLA). In other words, the techniques herein augment a DLA at the edge of the network with classifiers trained to recognize legitimate scanning behaviors, so as to reduce the rate of false positives (e.g., by correctly recognizing a legitimate versus illegitimate scanner). Local traffic buffers may be used at the edge to store suspicious traffic. Upon receiving anomalies that are flagged as legitimate, a central controller (e.g., an SCA) may request the anomalous traffic data, in order to train a classifier to encode these behaviors. In turn, is the central controller may broadcast/multicast the trained classifier to other learning agents/DLAs in the network.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, according to various embodiments, a device in a network receives an indication that a network anomaly detected by an anomaly detector of a first node in the network is associated with scanning activity in the network. The device receives labeled traffic data associated with the detected anomaly that identifies whether the traffic data is associated with legitimate or illegitimate scanning activity. The device trains a machine learning-based classifier using the labeled traffic data to distinguish between legitimate and illegitimate scanning activity in the network. The device deploys the trained classifier to the first node, to distinguish between legitimate and illegitimate scanning activity in the network.

Figure 5:
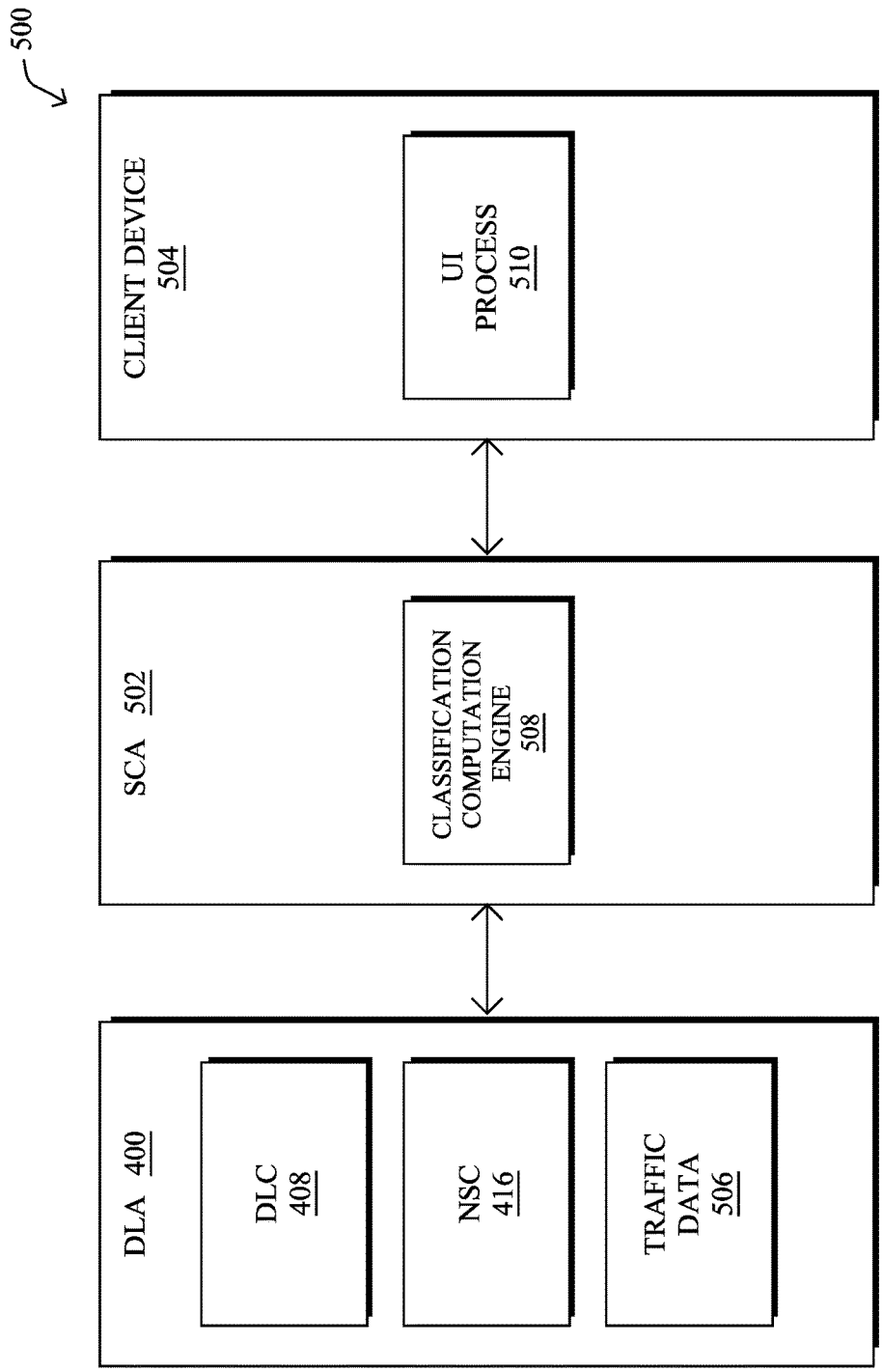
FIG. 5 illustrates an example architecture for distinguishing scan types.

Operationally, FIG. 5 illustrates an example architecture 500 for distinguishing scan types, according to various embodiments. One aspect of the techniques herein illustratively involve a remote learning agent that is equipped with an anomaly detection engine, such as DLA 400 shown. Notably, the anomaly detection engine (e.g., DLC 408) may use a set of machine learning models to detect anomalies at the edge of a network. For example, DLC 408 may employ an unsupervised machine learning-based anomaly detector that identifies statistical deviations in the characteristics of the network traffic. DLA 400 may also employ a traffic capture mechanism (e.g., NSC 416, etc.) that is in charge of dynamically capturing traffic data 506 of interest.

As described above, architecture 500 may also include an SCA 502 that provides supervisory control over DLA 400 and receives notifications of any anomalies detected by DLA 400. For example, SCA 502 may receive administrative commands and/or is parameters from a user interface (UI) process 510 executed by client device 504 or directly on SCA 502. Notably, SCA 502 may generate visualizations for display by UI process 510, thereby allowing an administrator or other user to review the anomaly detection mechanisms in the network. In response, the user may provide feedback regarding any detected anomalies to DLA 400 via SCA 502.

In various embodiments, SCA 502 may also execute a classification computation engine (CCE) 508 configured to interface with DLA 400 and UI process 510, to train and deploy classifiers that distinguish between legitimate and illegitimate scanning activities, as described in greater detail below.

FIGS. 6A-6F illustrate an example of the deployment of a scan classifier using architecture 500, according to various embodiments. As shown in FIG. 6A, assume that SCA 502 provides supervisory control over any number of DLAs 400a-400n (e.g., a first through nth DLA) and is in communication with client device 504.

In various embodiments, DLAs 400a-400n may not be equipped initially with any scanning classifiers. Instead, DLAs 400a-400n may only be equipped with anomaly detection engines configured to detect statistically anomalous network behaviors. In such cases, training of a scanning classifier may be prompted by the detection of an anomaly in the network. For example, assume that the anomaly detector of DLA 400a detects a network anomaly. In such a case, DLA 400a may send an AnomalyNotification( ) message 602 to SCA 502, notifying SCA 502 of the detected anomaly.

As shown in FIG. 6B, SCA 502 may report the anomaly detected by DLA 400a to a user, such as a network administrator or security expert. For example, SCA 502 may send an AnomalyReport( ) message 604 that includes information regarding the detected anomaly. In turn, client device 504 may present the anomaly information to the user via its UI process 510. In other embodiments, UI process 510 may be local to SCA 502.

As shown in FIG. 6C, client device 504 may receive input from the user that indicates whether the detected anomaly is associated with scanning activity in the network. In turn, client device 504 may provide this indication to SCA 502 via an AnomalyAssessment( )message 606. In various embodiments, the indication may further label whether or not any scanning activity is legitimate or illegitimate.

As shown in FIG. 6D, SCA 502 may analyze message 606, to determine whether or not the detected anomaly is even associated with scanning activity. If it is not, SCA 502 may take no further action for the anomaly with respect to training a scanning classifier. However, if AnomalyAssessment( )message 606 indicates that the anomaly is scanning-related, legitimate or not, SCA 502 may continue the training process as follows.

Assuming that the detected anomaly is scanning-related, a call may be made to CCE 508, to compute a machine-learning "signature" for legitimate network scanning to encode into a machine-learning model (e.g., a classifier, such as an auto-encoder). CCE 508 may also send a packet capture (PCAP)-Request( )message 608 to DLA 400a that raised the anomaly, to request the sending of traffic data 506 regarding the original traffic that raised the anomaly (e.g., captured traffic packets, characteristics derived therefrom, etc.). Such traffic may be characterized by a source/destination IP address, additional partner flows, duration and packet timing information, port information, or information specific to the IP protocol involved. If available, the traffic may also be characterized by device classification information about all the sources and destinations, such as from external providers (e.g., ISE or machine learning based clustering). Note that remote learning agents such as DLA 400a may make use of rotating buffers storing traffic flagged as potentially anomalous, thus storing the related suspicious traffic to be retrieved by external sources. In response, DLA 400a may return the requested traffic data to SCA 502 via a PCAP-Response( )message 610.

As shown in FIG. 6E, in response to receiving the traffic data associated with the raised anomaly, SCA 502 may train the classifier to distinguish between legitimate and illegitimate scans. For example, CCE 508 may re-compute its classifier with the label provided by the user (legitimate vs. illegitimate) in AnomalyAssessment( )message 606. is In particular, CCE 508 may apply the user-indicated label for the scanning type to the traffic data retrieved from DLA 400a and use the labeled data to train or update the classifier.

Assuming that SCA 502 has access to a sufficient number of such labels, the trained classifier should become able to distinguish the differences between legitimate and illegitimate classifiers, by itself. In practice, there may be a large imbalance between the amount of training data that corresponds to legitimate scanning activity, as determined in the previous steps, and the rest of the traffic. This requires that specific attention be given to the imbalance, when training statistical models. Coding approaches such as sparse coding/dictionary learning or auto-encoders may be learned only on the positive examples. Alternatively, discriminative methods may be biased on purpose to account for the class imbalance.

As shown in FIG. 6F, once SCA 502 has trained the scanning classifier, SCA 502 may deploy the classifier to any or all of DLAs 400a-400n. For example, SCA 502 may send the classifier to selected DLAs 400a-400n via Behavior-Classif( )message 610, to install the classifier to the learning agents. For example, SCA 502 may send message 610 to DLA 400*a* that detected the anomaly or may broadcast/ multicast message 610 to any or all of DLAs 400*a*-400*n*, thus updating their classifier to reflect the newly added legitimate scanning. In various embodiments, based on the results of the classifier, any of the receiving DLAs 400*a*-400*n* may suppress detected anomalies that are classified as being associated with legitimate scanning activity, thereby eliminating the need to maintain whitelists.

Figure 7A:
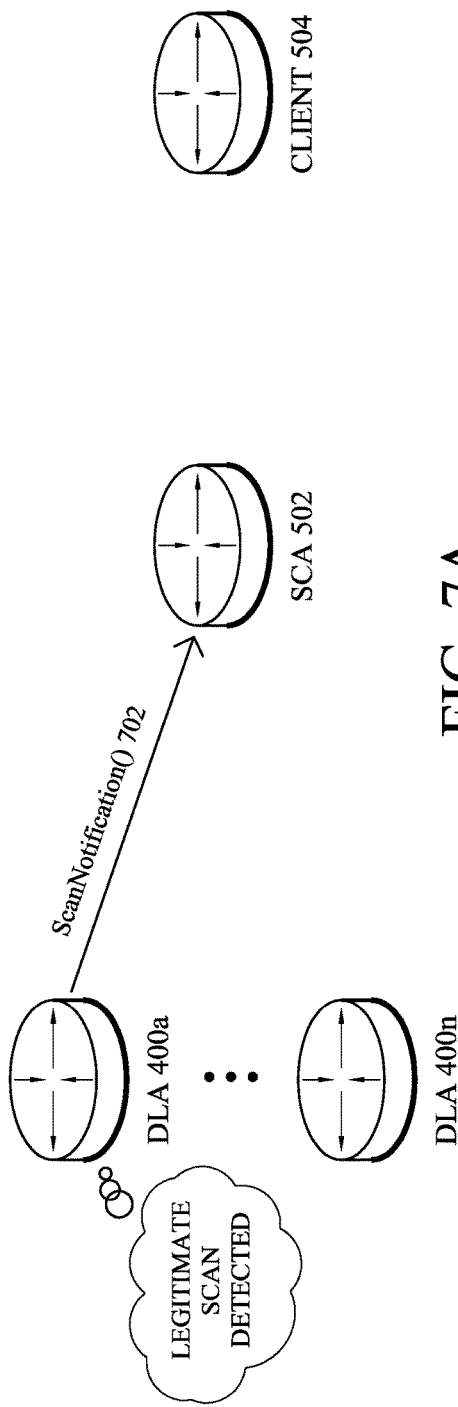

Referring now to FIGS. 7A-7D an example of the retraining of a scan classifier is illustrated, according to various embodiments. In some embodiments, the techniques herein can be used to refine the deployed scan classifier(s) on the DLA(s). In particular, the deployed scan classifiers deployed to DLAs 400*a*-400*n* may be configured to update CCE 508 on SCA 502, whenever a legitimate scan is detected. For example, as shown in FIG. 7A, assume that the scan classifier deployed to DLA 400*a* identifies/classifies a set of traffic as being associated with legitimate scanning activity. In such a case, DLA 400*a* is may send a ScanNotification( )message 702 to SCA 502 indicating that a legitimate scan was detected.

Notably, various safe guards may also be put in place according to the techniques herein. In particular, incorrect classification by a DLA may lead to false negative if, for example, the edge classifier incorrectly classifies traffic as legitimate although the traffic is illegitimate. The techniques herein thus specify an additional mechanism to verify the accuracy of the scans classified by DLAs 400*a*-400*n*.

Figure 7B:
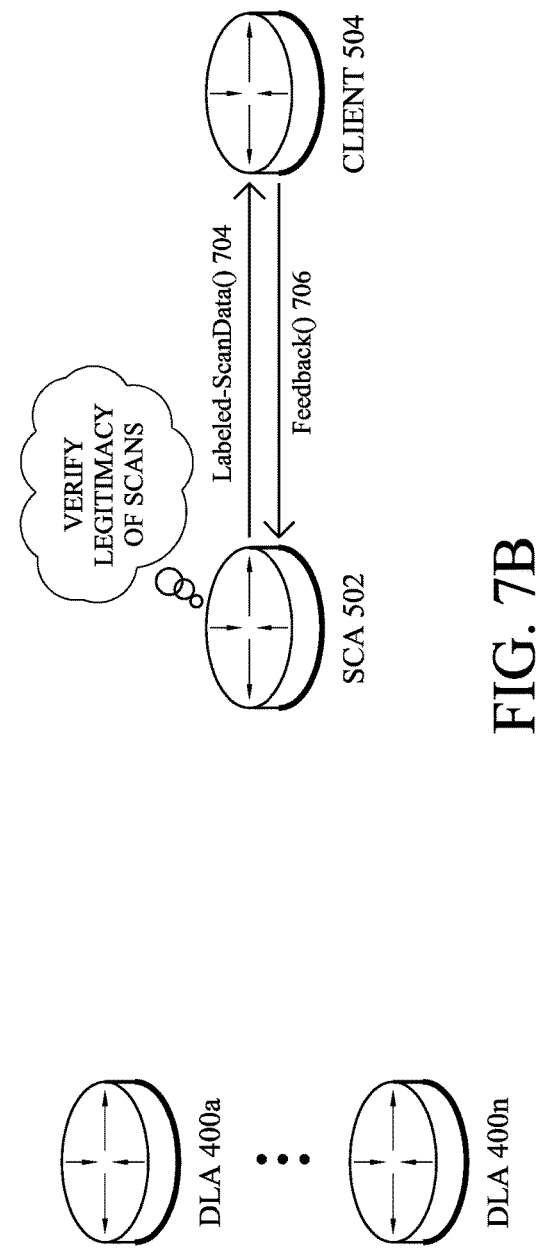

As shown in FIG. 7B, SCA 502 may verify the classification results by providing the classification results to UI process 510, allowing the user to confirm or reject the classification. For example, SCA 502 may provide an indication of the labeled scans to client 504 via a LabeledScanData( )message 704 that includes information regarding the classification(s). In some embodiments, SCA 502 may only send such a request for a sampling of the scanning activities classified as legitimate based, for example, on a probability P, which may take into account the number of samples seen, confidence in the model, etc. In turn, UI process 510 may send a Feedback( )message 706 to SCA 502 that indicates the user's own assessment of the scanning activities that were classified as legitimate.

As shown in FIG. 7C, if such an anomaly is flagged by the user as illegitimate, yet classified by the deployed classifier as legitimate, CCE 508 may reinitiate the above training process, to trigger a re-computation of the classifier using the traffic data that was improperly classified.

As shown in FIG. 7D, once SCA 502 has updated the classifier to account for the misclassified scanning behavior, SCA 502 may deploy the recomputed classifier to one or more of DLAs 400*a*-400*n*. Notably, SCA 502 may send the updated classifier to DLAs 400*a*-400*n* via a new unicast, multicast, or broadcast Behavior-Classif( )message 708.

Note that although the techniques herein are specified in the context of scanning behaviors, they can be applied to any behavior for which a supervised learning classifier is trained on the fly to recognize legitimate behaviors. Such a classification mechanism is is then combined with anomaly detection, in order to reduce false positives.

Figure 8:
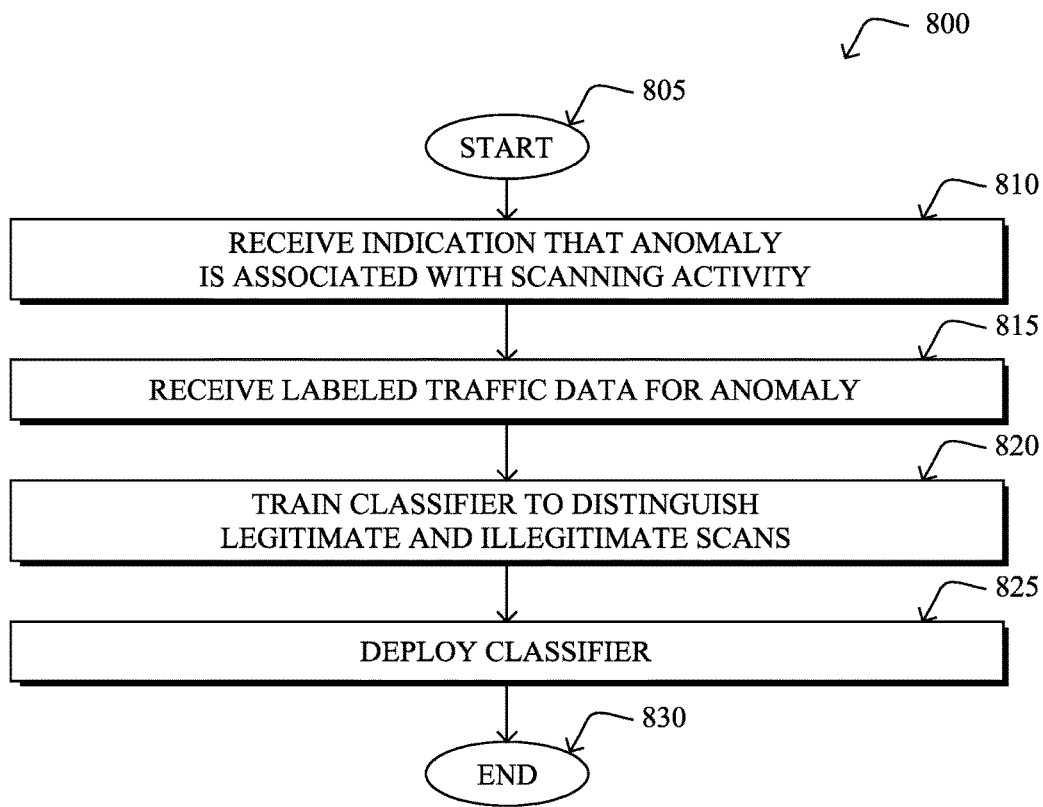
FIG. 8 illustrates an example simplified procedure for deploying a scan classifier in an SLN.

FIG. 8 illustrates an example simplified procedure for deploying a scan classifier in an SLN, in accordance with various embodiments herein. Generally, procedure 800 may be performed by a specialized device in a network that executes stored instructions, such as an SCA. Procedure 800 may start at step 805 and continue on to step 810 where, as described in greater detail above, the device may receive an indication that a detected anomaly is associated with scanning activity in the network. For example, such an anomaly may be detected by a machine learning-based anomaly detector deployed to a first node in the network, such as a DLA. In turn, the device may receive an indication (e.g., from a user interface) that identifies the detected anomaly as being associated with scanning activity in the network.

At step 815, as detailed above, the device may receive labeled traffic data associated with the detected anomaly. In various embodiments, such a label may identify the scanning activity associated with the detected anomaly as being legitimate or illegitimate. For example, if the input from the user indicates that the detected anomaly is associated with legitimate or illegitimate scanning activity, the device may retrieve the traffic data from the node that detected anomaly and associate such a label with the traffic data.

At step 820, the device may train a machine learning-based classifier using the labeled traffic data to distinguish between legitimate and illegitimate scanning activity in the network, as described in greater detail above. For example, the device may combine the labeled traffic data with other labeled traffic data to train a classifier configured to discern between legitimate scanning traffic and illegitimate scanning traffic. In some cases, the device may also leverage techniques such as sparse coding, dictionary learning, or autoencoders, depending on the sets of labeled traffic data available to the device.

At step 825, as detailed above, the device may deploy the trained classifier to the node that detected the anomaly. In some cases, the device may also deploy the classifier to one or more other nodes/DLAs in the network. For example, the device may send the classifier via multicast or broadcast to the other DLAs in the network, to allow these nodes to distinguish between legitimate and illegitimate scans. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for edge-based machine learning for encoding legitimate scanning. In particular, the techniques herein greatly reduce the number of false positives of anomaly detection systems effectively detecting a legitimate scanner, without having to maintain white lists. That is, the techniques herein reduce false positives by allowing for dynamic training of statistical models upon detecting legitimate behaviors, alleviating the cumbersome manual and incremental management of white lists.

While there have been shown and described illustrative embodiments that provide for edge-based machine learning for encoding legitimate scanning, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be is implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, an indication that a network anomaly detected by an anomaly detector of a first node in the network is associated with scanning activity in the network;
receiving, at the device, labeled traffic data associated with the detected anomaly that identifies whether the traffic data is associated with legitimate or illegitimate scanning activity;
training, by the device, a machine learning-based classifier using the labeled traffic data to distinguish between legitimate and illegitimate scanning activity in the network, wherein the trained classifier is configured to cause the first node to suppress anomalies detected by the anomaly detector that are classified by the classifier as being associated with legitimate scanning activity; and
deploying, by the device, the trained classifier to the first node, to distinguish between legitimate and illegitimate scanning activity in the network.

2. The method as in claim 1, wherein receiving the indication that the network anomaly is associated with scanning activity comprises:
receiving, at the device, the indication via a user interface, wherein the indication labels the associated scanning activity as being legitimate or illegitimate.

3. The method as in claim 2, further comprising:
sending, by the device, a request to the first node for the traffic data associated with the detected anomaly; and
labeling, by the device, the traffic data based on the indication received via the user interface.

4. The method as in claim 1, further comprising:
receiving, at the device, a notification of the detected anomaly from the first node; and
sending, by the device, data regarding the detected anomaly to a user interface for labeling.

5. The method as in claim 1, further comprising:
deploying, by the device, the classifier to the first node and to one or more additional nodes in the network via a broadcast or multicast message.

6. The method as in claim 1, further comprising:
receiving, at the device, a classification result from the first node that classifies a particular set of traffic data as associated with legitimate scanning activity; and
verifying, by the device, the legitimacy of the received classification result.

7. The method as in claim 6, wherein verifying the legitimacy of the received classification result comprises:
providing, by the device, a sampling of traffic data to a user interface that were classified as associated with legitimate scanning activity; and
receiving, at the device, feedback from the user interface regarding the sampling.

8. The method as in claim 7, further comprising:
retraining, by the device, the classifier based on the feedback indicating that at least a portion of the sampling was misclassified as associated with legitimate scanning activity.

9. An apparatus, comprising:
one or more network interfaces to communicate with a network;
a processor coupled to the network interfaces and configured to execute one or more processes; and
a memory configured to store a process executable by the processor, the process when executed operable to:
receive an indication that a network anomaly detected by an anomaly detector of a first node in the network is associated with scanning activity in the network;
receive labeled traffic data associated with the detected anomaly that identifies whether the traffic data is associated with legitimate or illegitimate scanning activity;
train a machine learning-based classifier using the labeled traffic data to distinguish between legitimate and illegitimate scanning activity in the network, wherein the trained classifier is configured to cause the first node to suppress anomalies detected by the anomaly detector that are classified by the classifier as being associated with legitimate scanning activity; and
deploy the trained classifier to the first node, to distinguish between legitimate and illegitimate scanning activity in the network.

10. The apparatus as in claim 9, wherein the apparatus receives the indication that the network anomaly is associated with scanning activity by:
receiving the indication via a user interface, wherein the indication labels the associated scanning activity as being legitimate or illegitimate.

11. The apparatus as in claim 10, wherein the process when executes is further operable to:
send a request to the first node for the traffic data associated with the detected anomaly; and
label the traffic data based on the indication received via the user interface.

12. The apparatus as in claim 9, wherein the process when executed is further operable to:
receive a notification of the detected anomaly from the first node; and
send data regarding the detected anomaly to a user interface for labeling.

13. The apparatus as in claim 9, wherein the process when executed is further operable to:
deploy the classifier to the first node and to one or more additional nodes in the network via a broadcast or multicast message.

14. The apparatus as in claim 9, wherein the process when executed is further operable to:
receive a classification result from the first node that classifies a particular set of traffic data as associated with legitimate scanning activity; and
verify the legitimacy of the received classification result.

15. The apparatus as in claim 14, wherein the apparatus verifies the legitimacy of the received classification result by:
providing a sampling of traffic data to a user interface that were classified as associated with legitimate scanning activity; and
receiving feedback from the user interface regarding the sampling.

16. The apparatus as in claim 15, wherein the process when executed is further operable to:
- retrain the classifier based on the feedback indicating that at least a portion of the sampling was misclassified as associated with legitimate scanning activity.

17. A tangible, non-transitory, computer-readable medium storing program instructions that cause a device in a network to execute a process comprising:
- receiving an indication that a network anomaly detected by an anomaly detector of a first node in the network is associated with scanning activity in the network;
- receiving, at the device, labeled traffic data associated with the detected anomaly that identifies whether the traffic data is associated with legitimate or illegitimate s scanning activity;
- training, by the device, a machine learning-based classifier using the labeled traffic data to distinguish between legitimate and illegitimate scanning activity in the network, wherein the trained classifier is configured to cause the first node to suppress anomalies detected by the anomaly detector that are classified by the classifier as being associated with legitimate scanning activity; and
- deploying, by the device, the trained classifier to the first node, to distinguish between legitimate and illegitimate scanning activity in the network.

18. The computer-readable medium as in claim 17, wherein the process further comprises:
- deploying, by the device, the classifier to the first node and to one or more additional nodes in the network via a broadcast or multicast message.

\* \* \* \* \*

UNITED STATES PATENT AND TRADEMARK OFFICE
CERTIFICATE OF CORRECTION

PATENT NO. : 10,243,980 B2
APPLICATION NO. : 15/205732
DATED : March 26, 2019
INVENTOR(S) : Jean-Philippe Vasseur et al.

It is certified that error appears in the above-identified patent and that said Letters Patent is hereby corrected as shown below:

In the Specification

In Column 1, Line 27, please amend as shown:
network may perform network scans to identify security In Column 1, Line 64, please amend as shown:
network. The device receives labeled traffic data associ- In Column 2, Line 34, please amend as shown:
extend the effective "size" of each network.

In Column 4, Line 18, please amend as shown:
resentations in a network-based architecture. In particular, In Column 4, Line 59, please amend as shown:
months (e.g., seasonal changes of an outdoor environ- In Column 5, Line 35, please amend as shown:
Cisco Systems, Inc., another operating system, etc.), In Column 6, Line 9, please amend as shown:
IETF Internet Draft entitled "BGP MPLS Based Ethernet In Column 7, Line 64, please amend as shown:
ing machine may construct a model of normal network In Column 8, Line 40, please amend as shown:
entities as a graph of nodes interconnected by edges. For Signed and Sealed this
Seventh Day of January, 2020

Andrei Iancu
*Director of the United States Patent and Trademark Office*

CERTIFICATE OF CORRECTION (continued)
U.S. Pat. No. 10,243,980 B2

In Column 9, Line 53, please amend as shown:
able to differentiate between the two classes (normal and In Column 10, Line 29, please amend as shown:
allow detection of an anomaly such as an horizontal In Column 10, Line 67, please amend as shown:
any or all of the following: computation of Self Organiz- In Column 11, Line 42, please amend as shown:
the like). TIP 404 may also generate or otherwise leverage In Column 12, Line 15, please amend as shown:
external network. This is a major advantage of such a In Column 12, Line 58, please amend as shown:
In turn, the central controller may broadcast/multicast the In Column 13, Line 32, please amend as shown:
commands and/or parameters from a user interface (UI)

In Column 14, Line 46, please amend as shown:
illegitimate) in AnomalyAssessment () message 606. In In Column 15, Line 58, please amend as shown:
fication mechanism is then combined with anomaly detec- In Column 17, Line 2, please amend as shown:
the components and/or elements described herein can be